16-70 AU 324 EX
FIF8401 OR RE 23,652

EXAMINER

May 5, 1953

K. KOLBUS

DOOR CHECK

Original Filed Feb. 11, 1946

Re. 23,652

Orig. 2477,486

INVENTOR
KARL KOLBUS

BY

ATTORNEYS

Reissued May 5, 1953

Re. 23,652

UNITED STATES PATENT OFFICE 23,652

DOOR CHECK

Karl Kolbus, Milwaukee, Wis., assignor to The Seneca Manufacturing Company, Cleveland, Ohio, a corporation of Ohio Original No. 2,477,486, dated July 26, 1949, Serial No. 646,822, February 11, 1946. Application for reissue September 11, 1952, Serial No. 309,158

6 Claims. (Cl. 16—70)

Matter enclosed in heavy brackets [ ] appears in the original patent but forms no part of this reissue specification; matter printed in italics indicates the additions made by reissue.

My invention refers to spring controlled door checks and it has for its primary object to provide a compact [convolute] spring and link connection to a piston rod, mounted in a cylinder, whereby a door, in approximately full open position, neutralizes the spring pressure, which pressure gradually increases when the door swings to a closed position, to thus insure full spring tension to hold the door positively shut and relieve said pressure when fully opened.

A further object of my invention is to provide [all] *a* door check actuating [mechanisms] *mechanism* within *the* confines of the width of a door jamb, whereby clearance is had to attach an outside screen door when desired.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying [drawings] *drawing* is illustrated one complete example of the physical embodiment of the present invention constructed according to the best mode so far devised for the practical application of the principles thereof.

In the [drawings] *drawing:*

Figure 1:
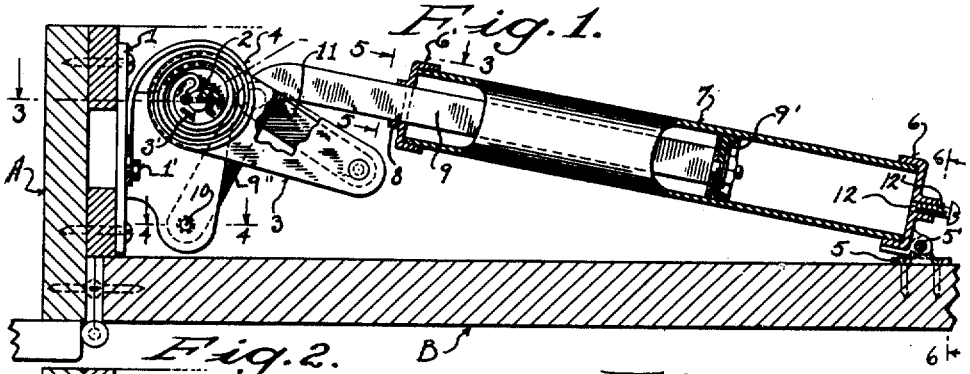
Fig. 1 represents a plan sectional view of a door mechanism having fitted thereto a spring controlled check embodying the features of my invention, with parts broken away and in section to illustrate structural features, the section being partly indicated by line 1—1 of Fig. 3.

Referring by characters to the [drawings] *drawing,* A indicates a door frame having hinged thereto a door B. Secured to the strips of the door frame is a bracket 1 having extended therefrom a stud 2, journaled upon which stud is a lever 3 having a hub 3′ retained thereon by a cotter pin.

The inner looped end of a convolute spring 4 engages the hub 3′ and the outer coil of said spring is extended tangentially and secured to the base of the bracket by means of a stud 1′ interlocked with a slot in the spring end.

At a predetermined distance from the door hinge, a flanged clip 5 is secured thereto. A cylinder head 6 is secured to the clip by a pivot bolt 5′, which bolt extends through companion ears of said clip and cylinder head.

Figure 5:
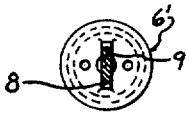
Fig. 5 is a cross section through the piston rod, the section being indicated by line 5—5 of Fig. 1.
Figure 6:
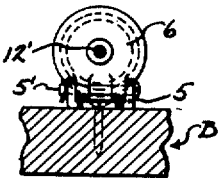
Fig. 6 is a cross section, as indicated by line 6—6 of Fig. 1.
Figure 4:
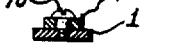
Fig. 4 is a cross section through a bracket portion illustrating the pivotal connection [between the (same and a piston rod)], *the section being indicated by the line 4—4 in Fig. 1.*

A cylinder 7 is secured to the head 6 and the inner end of said cylinder has secured thereto a second head 6′, which second head is provided with free vent apertures, as shown in Figure 5 of the [drawings] *drawing* and also a central slot 8 for sliding engegement with a flat piston rod 9, the slot in said head serving as a guide for the same. *As shown, each horizontal side of the piston rod extends in a plane which is normal to the door face, thus providing a flat rod which can be of considerable beam depth.*

The outer end of the *flat* piston rod 9 has secured thereto a piston 9′ reciprocated within the cylinder. The inner exposed end of the *flat* piston rod is formed with an extended elbow 9″, which elbow is secured to the bracket 1 by a pivot bolt 10, the same being approximately at a right angle to the *flat sides of the* piston rod body.

The piston rod 9 at its junction with the elbow section 9″ has pivoted thereto a *flat* link 11 the opposite end of which link is pivoted to the end of the lever 3. In the back and forth swing of the door the lever 3 rotates upon its axis stud 2 through an arc of a circle approximating 50 degrees, whereby the coil spring under constant tension is partly wound and unwound.

In the position of the parts assumed in Fig. 1, the spring is exerting approximately a maximum tension upon the closed door *through the advantageous leverage arrangement as shown in Fig. 1.*

Figure 2:
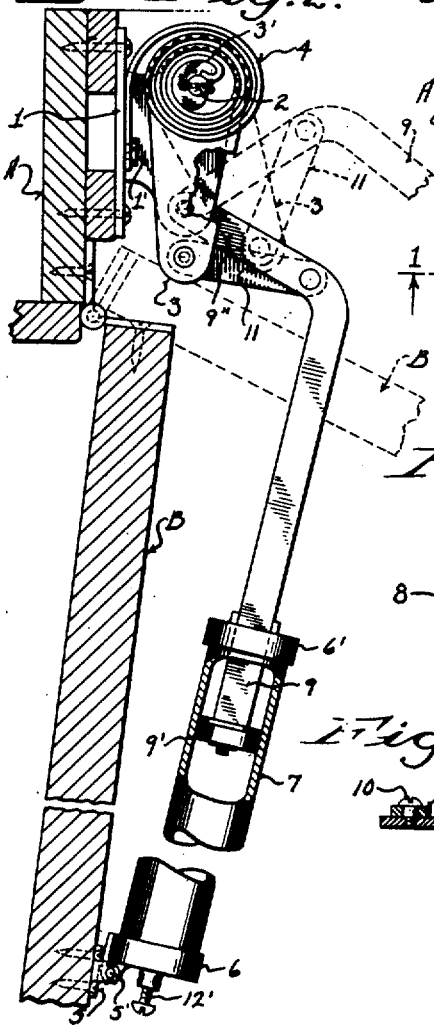
Fig. 2 is a similar sectional view illustrating the door check mechanism in its full open position.
Figure 3:
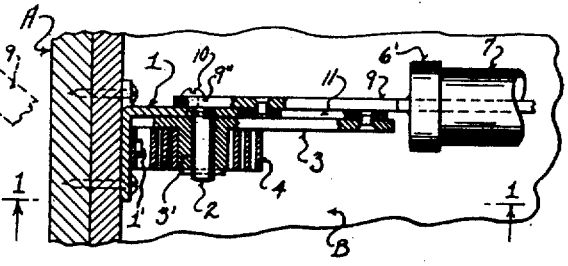
Fig. 3 is a fragmentary longitudinal sectional view of the [same] *spring mechanism,* the section being indicated by line 3—3 of Fig. 1.

When the door is swung to its open position, as illustrated in Fig. 2, the piston freely moves [downwardly] *outwardly* within the cylinder, while at the same time [it] *the cylinder* swings upon its pivot connection 5′ to exert a slight winding tension upon the spring as the link 11 exerts an oscillating movement upon said lever, whereby, due to the angular position with relation to the link and pivot point of the piston *rod* elbow, the closing strain of the spring is neutralized, whereby the door may remain open, due to the fact that its load is sufficient to resist closing.

From the foregoing description it will be apparent, due to the toggle link connections between the spring and piston rod, the door is firmly closed, and when fully opened, it may rest in this open position. However, the door closure control may be regulated due to the fact that an air cushion is developed between the piston 9' and head 6. The regulation of this cushion is obtained by a release vent 12 in the head 6, and said vent may be entirely cut off or varied by an adjustable tapered screw 12' in threaded engagement with the release vent.

*While the flat lever arrangement and pivotal locations thereof relative to spring actuated lever 3, elbowed flat piston rod 9''—9 and pivot 10 on bracket 1 are such that while obtaining maximum advantage of the stored energy of the spring as the lever approaches door closed position, the beam strengths of the link and piston rod can be quite substantial in a design readily confined within the overall width of a door jamb. Thus a rugged construction of the lever, link, piston rod and piston rod bearing is afforded that can withstand the shocks and jars incident to a violent wind opening of the door.*

I claim:

1. A door check comprising an angular bracket adapted to be secured to a door frame *within the confines of the door jamb of said frame*, a stud extending therefrom, a hubbed lever journalled upon the stud, a convolute spring having its inner end secured to the lever hub and its outer end secured to the bracket, a *door check* cylinder, *a head mounted upon the inner end of the cylinder*, a second head mounted upon the [inner] *outer* end of the cylinder, an air vent in said [second] *outer* head, a clip adapted to be secured to a door in pivotal connection with [an] *the* outer head, a piston rod slidably guided in the [second] *inner* head carrying a piston mounted in the cylinder, the exposed end of the piston rod being provided with an elbow extension in pivotal union with the bracket *within the door opening* and a link in pivotal union *at one end thereof* with the piston rod elbow and *in pivotal union at its other end with* [spring controlled] *said* lever.

2. A door check comprising a stud carrying bracket, a lever having a hub mounted upon the stud, a [convolute] *convolute* spring connected to the lever hub and bracket, a headed cylinder adapted to be pivotally secured to a door, a piston therein, a piston rod carried by said piston, the piston rod terminating with an elbow approximately at a right angle to the main portion of the piston rod, a pivot connection between the piston rod elbow and bracket, a toggle link connecting [the spring controlled] *said* lever and piston rod elbow, and adjustable means for venting one end of the cylinder.

*3. A door check comprising an angular bracket adapted to be secured to a door frame within the confines of the door jamb of said frame, said bracket having a base portion and a stud supporting portion extending normal to the base portion when the bracket is secured to an inner face of a door jamb, a flat lever carrying stud extending through the normal extending portion of the bracket structure, a flat lever having a hubbed construction and carried by the stud with the flat side thereof disposed adjacent the normally extending portion of the bracket, a coiled spring having one end thereof connected to the bracket structure and the other end connected to the lever through the hubbed construction on the lever, a door check cylinder, a head mounted upon the outer end of the cylinder, a second head mounted upon the inner end of the cylinder, said first cylinder head being provided with an air vent valve, said second head being provided with a rectangularly shaped piston rod slideway bearing structure, a clip adapted to be secured to a door in pivotal connection with the outer cylinder head, a flat piston rod rectangular in cross section adapted to slide in the bearing structure of the inner head, said piston rod having a width considerably greater than its thickness and being pivotally connected at its outer end to said normal extending portion of the bracket with the flat side thereof disposed parallel to said portion thereof, said piston rod having an approximate right angled bend therein to form a flat elbow, and a flat link pivotally connected at one end thereof to the lever and in pivotal union at its other end with the elbow bend of the piston rod whereby the force of the spring is exerted upon the door through the lever to the link and through the link to the door check piston and cylinder structures when the device is mounted on a door jamb between two doors supported by the door jamb structure.*

*4. A door check comprising an angular bracket adapted to be secured to a door frame within the confines of the door jamb of said frame, a stud shaft extending therefrom, a hubbed, flat lever mounted upon the stud shaft, a coiled spring having its one end connected to the hub of the lever and its other end connected to the bracket, a cylinder, a head mounted upon the inner end of the cylinder, an outer head secured to the other end of the cylinder, a clip pivotally connected to the outer head and an air vent in the outer head, a piston rod slidably guided in the inner head carrying a piston mounted on the cylinder, the exposed end of the piston rod being provided with an elbow extension in pivotal union with the bracket, and a link having an end thereof in pivotal union with the piston rod elbow and its other end in pivotal union with said lever and disposed flatwise between the piston rod and the lever.*

*5. A door check comprising an angular bracket adapted to be secured to a door frame within the confines of the door jamb of said frame, a pivot stud extending from the bracket, a hubbed lever upon the stud, a coiled spring having one end thereof connected to the bracket and its other end connected to the hub of the lever, a cylinder, a head mounted upon the outer end of the cylinder and provided with an air vent valve, a clip adapted to be secured to a door in pivotal connection with said head, a second inner head, a piston rod rectangular in cross section slidably guided in the second head and carrying a piston mounted in the cylinder, said rectangular piston rod having a beam depth which is greater in a horizontal direction than in a vertical direction and being pivotally connected at its outer extended end in a horizontally flat-wise relation to the bracket, said extended piston rod end having an elbow bend therein and a flat link having one end thereof in pivotal union with the elbow formation of the piston rod and having its other end in pivotal union with said lever.*

*6. A door check comprising a spring bracket adapted to be secured to a door frame, a hubbed lever pivotally supported on the bracket, a coiled spring mounted on the bracket having one end*

*thereof connected to the bracket and the other end connected to the lever hub, a cylinder, heads mounted upon the inner and outer ends of the cylinder, the outer head being provided with an air venting means and the inner head constituting a bearing for a piston rod which is rectangular in cross section with a greater dimension of the section extending horizontally, a rectangular sectioned piston rod slidably guided in the inner head bearing and carrying a piston mounted in the cylinder, the piston rod having an elbow bend approximately at a right angle to the main portion of the piston rod said bracket having a horizontally disposed wall to which the outer end of the rectangular piston rod is pivotally connected in flatwise relation to said bracket wall, and a flat link in pivotal union with the elbow bend of the piston rod and with said lever.*

KARL KOLBUS.

References Cited in the file of this patent or the original patent

UNITED STATES PATENTS

| Number | Name | Date |
|---|---|---|
| 527,753 | Larsson | Oct. 16, 1894 |
| 539,088 | Shrawder | May 14, 1895 |

16-70